United States Patent [19]
Davis

[11] 3,846,054
[45] Nov. 5, 1974

[54] APPARATUS FOR FABRICATING DOUBLE-SKIN FOAM CORE CONSTRUCTION PANELS

[75] Inventor: Bernard H. Davis, Stoney Creek, Ontario, Canada

[73] Assignee: H. H. Robertson Company, Pittsburgh, Pa.

[22] Filed: Sept. 5, 1973

[21] Appl. No.: 394,411

[52] U.S. Cl.............. 425/110, 156/79, 156/91, 156/245, 156/500, 156/510, 156/556, 52/309, 52/400, 52/404, 52/618, 52/625, 425/289, 425/817 C
[51] Int. Cl............................................. B32b 5/20
[58] Field of Search........ 425/433, 817 C, 115, 122; 156/79, 91, 245, 500, 543, 556; 52/404, 309, 400, 618, 625

[56] References Cited
UNITED STATES PATENTS

| | | | |
|---|---|---|---|
| 3,174,887 | 3/1965 | Voelker | 156/79 |
| 3,178,768 | 4/1965 | Edberg | 425/122 X |
| 3,697,205 | 10/1972 | Ross et al. | 425/122 X |
| 3,702,274 | 11/1972 | Wooler | 156/79 |

*Primary Examiner*—Edward G. Whitby
*Attorney, Agent, or Firm*—Harry B. Keck; George E. Manias

[57] ABSTRACT

A method of fabricating double-skin foam filled construction panels wherein the two sheets are joined along adjacent first edges by a resilient strip connection; the two sheets are separated along adjacent second edges remote from the resilient strip connection to provide an opening therebetween; foam forming ingredients are introduced through the opening and distributed across the width of and along the length of one of the sheets; the sheets are aligned with the central webs thereof in confronting relation; and the sheets are retained in the aligned relationship until the foam forming ingredients have completed their foaming and volume expansion, and provide a foamed-in-place core which connects the two sheets. Apparatus is described for fabricating the construction panels.

10 Claims, 31 Drawing Figures

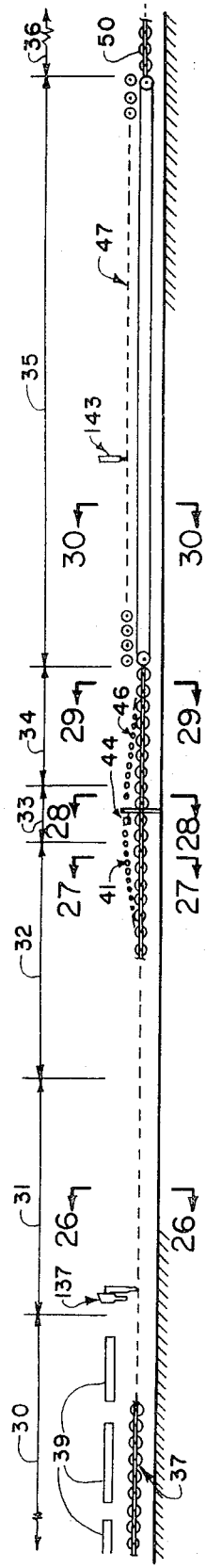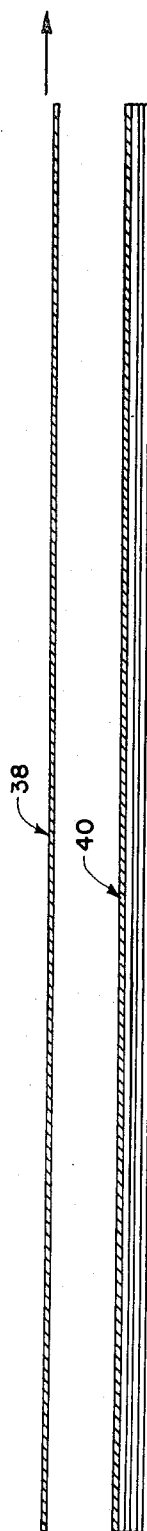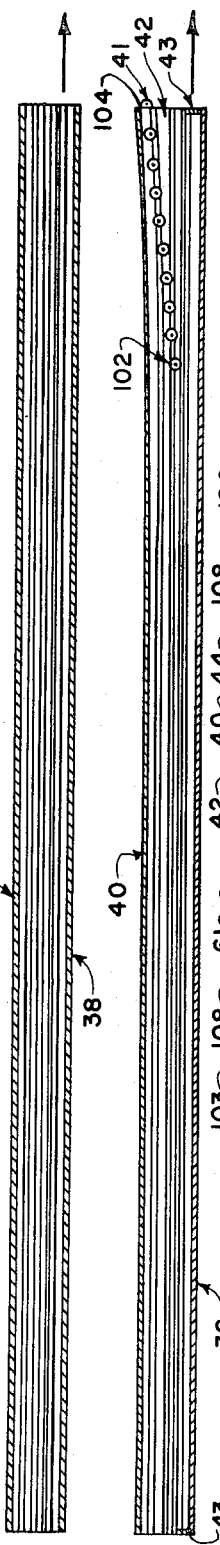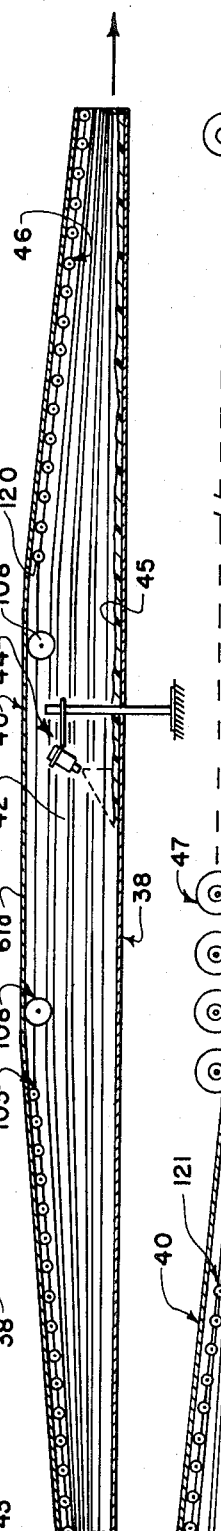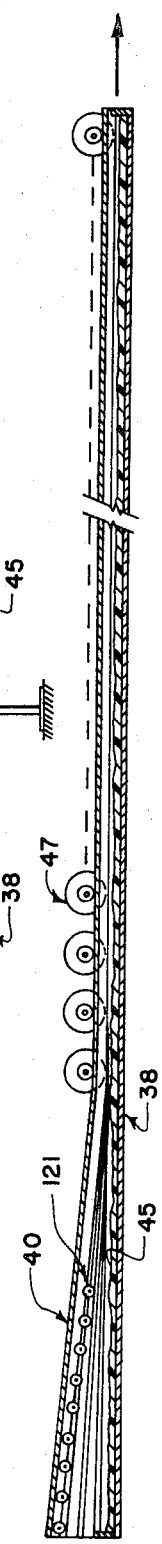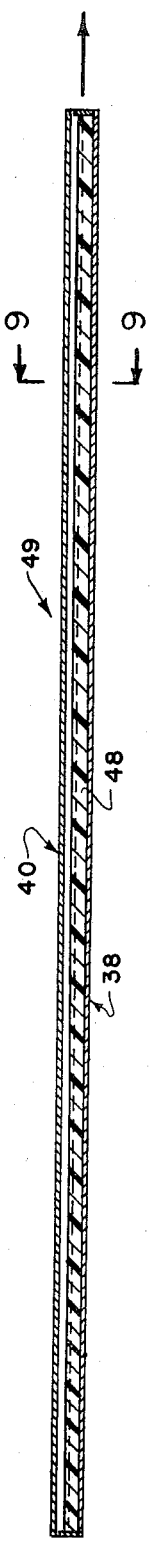
Fig. 1
Fig. 2
Fig. 3
Fig. 4
Fig. 5
Fig. 6
Fig. 7

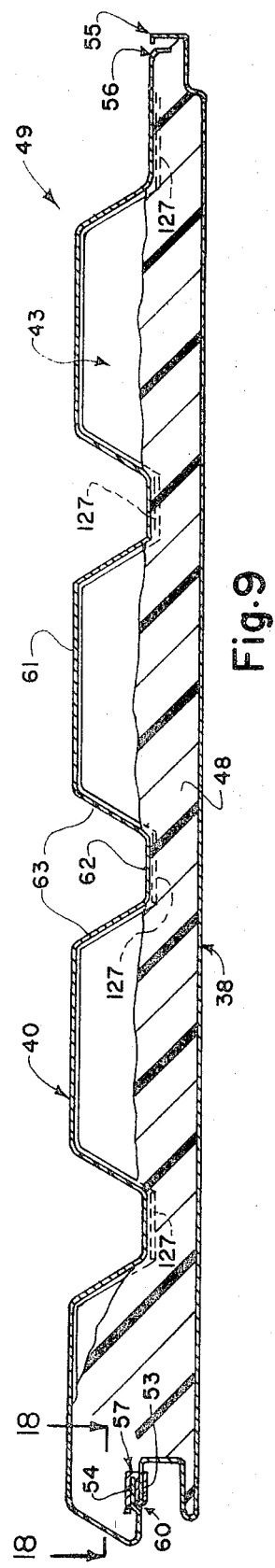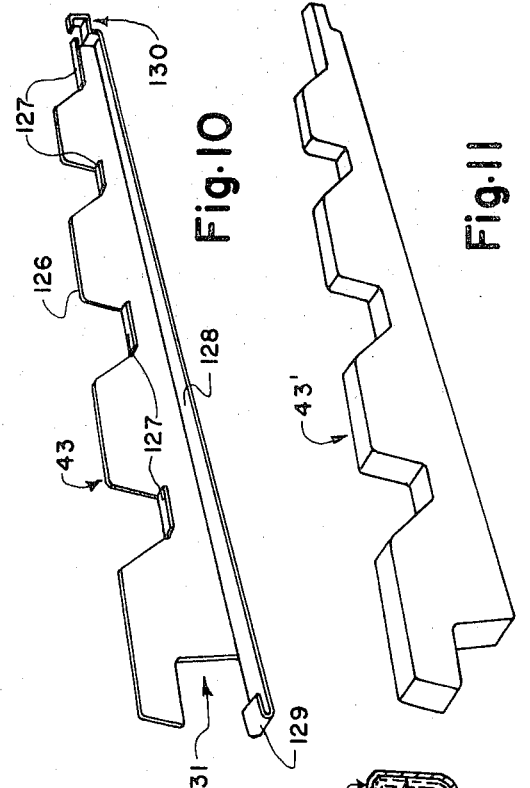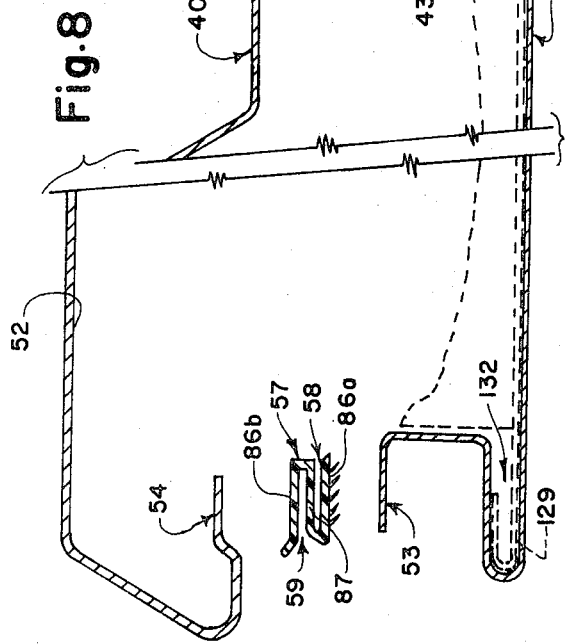

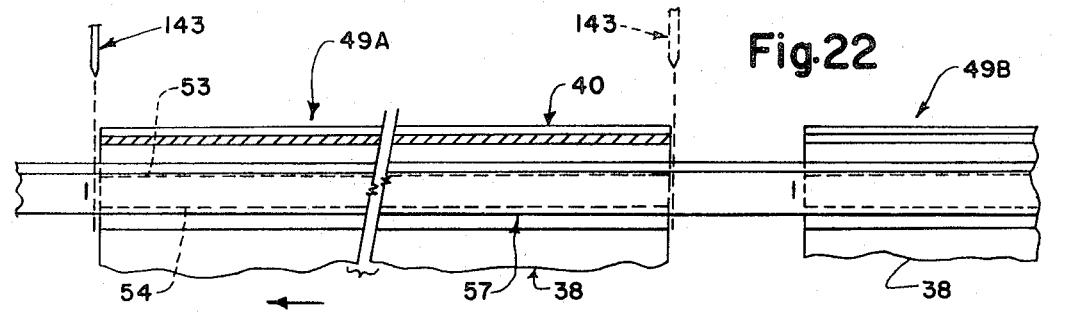
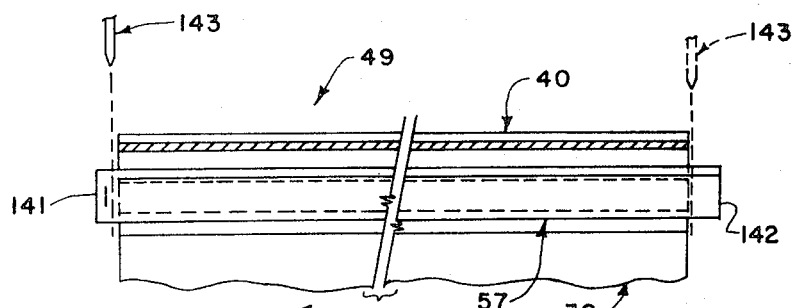
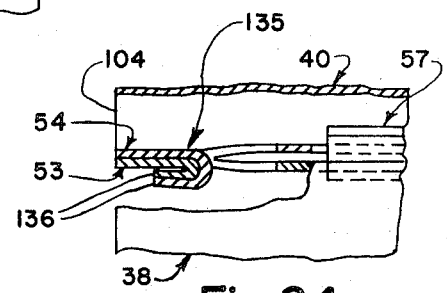
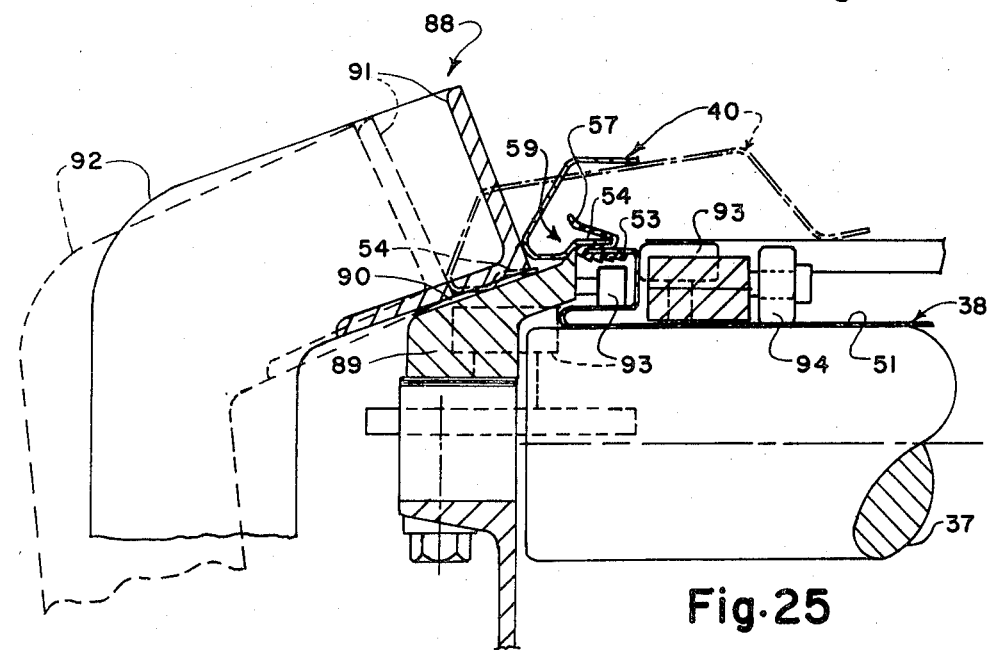

3,846,054

APPARATUS FOR FABRICATING DOUBLE-SKIN FOAM CORE CONSTRUCTION PANELS

BACKGROUND OF THE INVENTION

1. Field of the Invention

This invention relates to apparatus for making double-skin building construction panels having a foamed-in-place core.

2. Description of the Prior Art

Various methods of producing prefabricated foam-filled building construction panels are known in the prior art. In a first method, a foaming plastic composition, in a liquid state, is introduced between continuous ribbons of various materials which the ribbons are moved in unison at a selected speed. Examples of this method type will be found in U.S. Pat. No. 2,866,730 (POTCHEN et al, December 1958); 2,983,962 (MERZ et al, May 1961); 3,174,887 (VOELKER, March 1965); 3,560,285 (SCHROTER et al, February 1971). In a second method type, two sheets are supported by a jig (mold apparatus), clamped in spaced-apart relation, and a foamed plastic composition, in a liquid state, is introduced therebetween and allowed to expand and cure. Examples of the second method type will be found in U.S. Pat. Nos. 3,090,078 (ACKLES, May 1963); 3,203,042 (AXELSSON, August 1965); 3,203,043 (MATHEWS, August 1965); and M. E. BAILEY et al, "Rigid Urethane Foams," S.P.E. Journal, (May 1958), p. 31–33.

The first method type requires sheet material in the form of continuous ribbons. The continuous ribbon feed material necessitates the inclusion of cut-to-length apparatus operable after foaming of the continuous laminate.

The second method type requires a large inventory of complex and expansive mold apparatus in order to produce panels at an acceptable rate.

Building construction panels having a foam core also are known wherein the adjacent edges at one side or both sides of the panel are connected by spacer elements, see U.S. Pat. Nos. 3,367,076 (O'BRIEN, September 1965); 3,386,218 (SCOTT, June 1968); 3,372,520 (HENSEL, March 1968). The O'BRIEN panel is produced by injecting the foam forming material into the space defined by the preassembled skins and edge connectors. The method of making the SCOTT and HENSEL panels is not disclosed.

SUMMARY OF THE INVENTION

The principal object of this invention is to provide a apparatus for fabricating double-skin construction panels having a foamed-in-place core.

Another object of this invention is to provide apparatus for fabricating a double-skin foamed core construction panel wherein adjacent edges of the two sheets are joined by a resilient strip — the resilient strip serving, during the fabrication of the panel, as a connector for the two sheets and as a hinge about which the two sheets are pivoted.

A further object of this invention is to provide apparatus for fabricating double-skin construction panels having a foamed-in-place core, without resorting to the expensive and complex mold apparatus used extensively by the prior art apparatus.

The present invention provides a method of fabricating a building construction panel of the type comprising a liner sheet, a facing sheet, and a foamed-in-place foam core. The phrase "liner sheet" is intended to identify that panel sheet presented on the interior of a building, whereas the phrase "facing sheet" is intended to identify that panel sheet presented on the exterior of a building.

The present method and apparatus may be used to fabricate the building construction panel described and claimed in copending application Ser. No. 306,190 filed Nov. 14, 1972 and assigned to the assignee of the present invention.

The present method of fabricating building construction panels comprises joining the two sheets by means of the resilient strip connection along adjacent first edges thereof and with the central webs thereof in confronting relation; separating the two sheets along the second edges thereof remote from the resilient strip connection, thereby to provide an opening therebetween; introducing foamable foam forming ingredients through the opening between the second edges of the two sheets and distributing the ingredients along the length and across the width of at least one of the sheets; aligning the two sheets to position the central webs thereof on confronting relation and with the second edges thereof approximately disposed, while the foam forming ingredients therebetween are actively foaming and increasing in volume; and retaining the two sheets in the aligned relation until the foam forming ingredients have completed their foaming and volume expansion, and provide a foamed-in-place core connecting the two sheets.

Apparatus for assembling building construction panels, in accordance with this invention, comprises sequential stations including a sheet assembly station wherein a resilient strip connector is applied to the first edge of the liner sheet, and wherein the first edge of the facing sheet is engaged with the resilient strip connector thereby to provide a resilient strip connection between the first edges of the two sheets. A sheet diverging station wherein the thus joied sheets are diverged along second edges thereof remote from the resilient strip connection, thereby to provide an opening therebetween. A foaming station wherein foamable foam forming ingredients are applied to at least one of the sheets, e.g., the liner sheet. A sheet converging station wherein the two sheets are converged along the second edges thereof to position the central webs thereof in confronting relation with the actively foaming foam forming ingredients between the thus aligned sheets. A retention station wherein the thus converged sheets are retained in the confronting relation for a time sufficient to allow the foam forming ingredients to complete their foaming and volume expansion, and provided a foamed-in-place core connecting the two sheets. Conveyor means is provided for supporting and moving the two sheets through the sequential stations.

BRIEF DESCRIPTION OF THE DRAWINGS

FIG. 1 is a side elevation view schematically illustrating the sequential zones of apparatus for performing the method of this invention;

FIGS. 2 through 7 are longitudinal cross-sectional views, schematically illustrating a relative position of the two sheets while advancing through the sequential zones of the apparatus of FIG. 1;

FIG. 8 is a broken, exploded cross-sectional view illustrating the two sheets and the resilient strip connector;

FIG. 9 is a cross-sectional view taken along the line 9—9 of FIG. 7;

FIG. 10 is a perspective view illustrating and end closure element;

FIG. 11 is a perspective view illustrating an alternative end closure element;

FIG. 22 is a fragmentary cross-sectional view, similar to FIG. 18, illustrating the trimming of the resilient strip connector;

FIG. 23 is a view similar to FIG. 22, illustrating an alternative arrangement for trimming the resilient strip connector;

FIG. 24 is a fragmentary side view, partly in cross-section and as viewed from the line 24—24 of FIG. 19, illustrating tab means for locking the two sheets in registered relation;

FIG. 25 is a cross-sectional view, illustrating sheet engaging means for providing a resilient strip connection between the two sheets;

DESCRIPTION OF THE PREFERRED EMBODIMENTS

Figure 12:
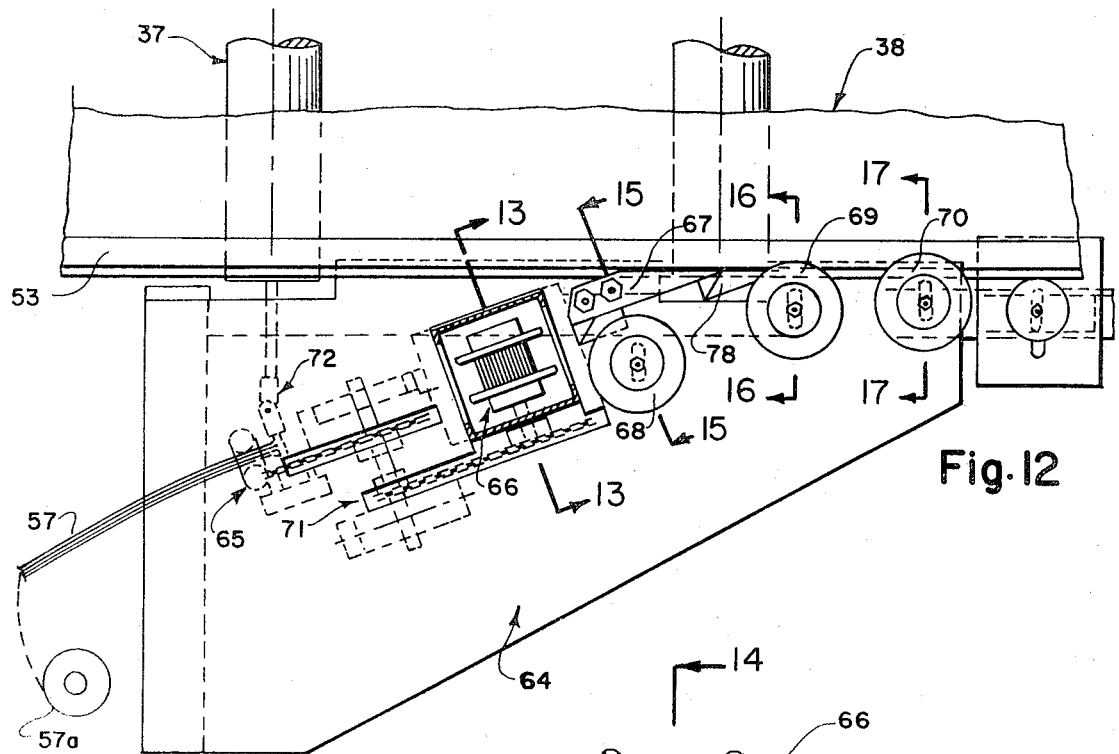
FIG. 12 is a fragmentary plan view, partially in cross-section, illustrating means for applying a resilient strip connector to the liner sheet lip.

FIG. 1 illustrates apparatus for performing the method of this invention. The apparatus includes sequential zones comprising a sheet preheating zone 30, a sheet assembly zone 31, a sheet diverging zone 32, a foaming zone 33, a sheet converging zone 34, a sheet retention zone 35, and a panel discharge zone 36. Conveyor means 37 is provided for advancing the sheets through the zones 30 through 34. Other conveyor means advances the sheets through the zones 35, 36 as will be hereinafter described.

A first sheet, e.g., a liner sheet 38 (FIG. 2) is conveyed by the conveyor means 37 (FIG. 1) through the preheating zone 30 wherein heating means 39 preheats the liner sheet 38 to a selected temperature. The liner sheet 38 is then advanced to the sheet assembly station 31 wherein the liner sheet 38 is joined to a second sheet, e.g., a facing sheet 40 (FIG. 3) along adjacent first edges by means of a resilient strip connection, as will be described. The thus joined sheets 38, 40 are advanced to the sheet diverging zone 32 wherein the sheets 38, 40 are diverged along corresponding second edges by first ramp means 41 thereby to provide an opening 42 between the corresponding second edges of the sheets 38, 40. In the sheet diverging zone 32, closure elements 43 (FIG. 4) may be applied to the opposite ends of the liner sheet 38. The diverged sheets 38, 40 are then advanced through the foaming zone 33 wherein foam distributing means 44 (FIG. 5) introduces foamable foam forming ingredients through the opening 42. The foam distributing means 44 deposits a coating 45 of the foam forming ingredients on the liner sheet 38. The sheets 38, 40 are advanced through the sheet converging zone 34 wherein the two sheets 38, 40 are converged along the corresponding second edges by second ramp means 46 (FIG. 5). In the sheet converging zone 34, the central webs of the sheets 38, 40 are positioned in confronting relation (compare FIGS. 5 and 6) while the foam forming ingredients therebetween are actively foaming and increasing in volume. The converged sheets 38, 40 are then advanced through the sheet retention zone 35 wherein panel sizing conveyor means 47 (FIG. 6) retains the two sheets 38, 40 in the aforesaid confronting relation and in the selected spaced-apart relationship (panel thickness) until the foam forming ingredients have completed their foaming and volume expansion. The foamed and expanded foam forming ingredients provide a foam core 48 (FIG. 7) which bonds the liner sheet 38 to the facing sheet 40, thereby providing a double-skin foam-core construction panel 49 (FIG. 7). The completed panel 49 is conveyed by discharge conveyor means 50 (FIG. 1) to panel storage and shipping areas.

Referring to FIG. 8, the two sheets 38, 40 have, respectively, central webs 51, 52; corresponding first edges 53, 54; and corresponding second edges 55, 56. A resilient non-metallic strip connector 57 comprises lower and upper arms 86a, 86b connected to a central arm 87 and arranged to define oppositely opening recesses 59, 60 adapted to receive the corresponding first edges 53, 54 of the sheets 38, 40. The strip connector 57 may be formed from plastic material capable of providing the required thermal break. In one commercial embodiment, the strip connector 57 is formed from semi-rigid polyvinyl chloride by a conventional extrusion process.

As best shown in FIG. 9, the sheets 39, 40 are joined along the first edges 53, 54 by means of a resilient strip connection 60 which is provided by the strip connector 57. The opposite or second edges 55, 56 of the sheets 38, 40 are spaced-apart. Thus, in the building construction panel 49 there is no metal-to-metal contact between the sheets 38, 40.

As best seen in FIG. 9, the facing sheet 40 is profiled and presents alternating crests 61 and valleys 62 which are joined by inclined webs 63. The foam core 48 adheres to the liner sheet 38 and to the valleys 62 of the facing sheet 40. With the exception of the region immediately adjacent to the strip connector 57, the flutes defined by the web 63 and crest 61 remain essentially unfilled. The closure elements 43 (only one visible) provided at each end of the liner sheet 38 are profiled to correspond with the profile of the facing sheet 40 thereby filling the flutes at each end of the building panel 49.

The closure element 43 (FIG. 10) may be fabricated from light gauge sheet metal or thin plastics. The closure element 43 presents a profiled upper edge 126 matching the profile of the facing sheet 40; ledges 127 adapted to support the facing sheet valleys 62 (FIG. 9) only prior to completion of the foaming; a lengthwise lower flange 128 having first and second ribs 129, 130 formed at the opposite ends thereof; and a large recess 131 adjacent to the first rib 129. As illustrated in FIG. 8, the closure element 43 (illustrated in dotted outline) is frictionally retained on the liner sheet 38 by introducing the ribs 129, 130 into corresponding recesses 132, 133 presented along the opposite sides of the liner sheet 38. The ledges 127 are adapted to support the facing sheet valleys 62 during passage of the two sheets 38, 40 through the sheet retention zone 35 and while foam forming ingredients are foaming and expanding. When the foam forming ingredients have completed their volume expansion, the facing sheet valleys 62 are spaced-apart from the ledges 127 (see FIG. 9).

Alternatively, a closure element 43' (FIG. 11) formed of foamed plastic material may be employed. The closure element 43' may be secured to one of the sheets 38, 40 by any one of a variety of suitable adhesives.

STRIP CONNECTOR APPLICATOR

FIG. 12 illustrates applicator means 64 for applying the resilient strip connector 57 to the first edge 53 of the liner sheet 38. The applicator means 64 includes strip guide means 65, a feed mechanism 66, a spreader blade 67, and spaced-apart guide wheels 68, 69 and 70. The feed mechanism 66 preferably is driven directly by the conveyor means 37, for example, by a chain and sprocket arrangement 71 and a universal joint 72, whereby the linear speed of the strip connector 57 matches that of the liner sheet 38.

Figure 14:
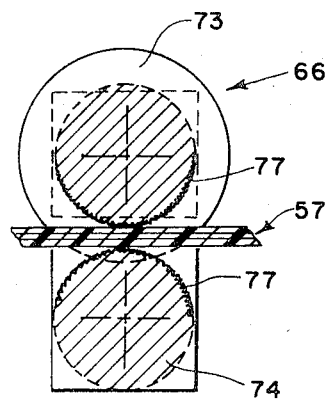
FIG. 14 is a cross-sectional view taken along the line 14—14 of FIG. 13.
Figure 13:
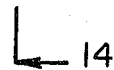
FIG. 13 is a cross-sectional view taken along the line 13—13 of FIG. 12.

The feed mechanism 66 (FIGS. 13, 14) may comprise an idler pinch roll 73 and a driven pinch roll 74 supported for rotation by journals 75, 76 respectively. The pinch rolls 73, 74 preferably are provided with knurled surfaces 77 which firmly grip the strip connector 57 and move the same through the applicator means 64. Supply means schematically illustrated at 57a (FIG. 12) feeds the strip connector 57 to the feed mechanism 66, as a continuous strip.

Figure 15:
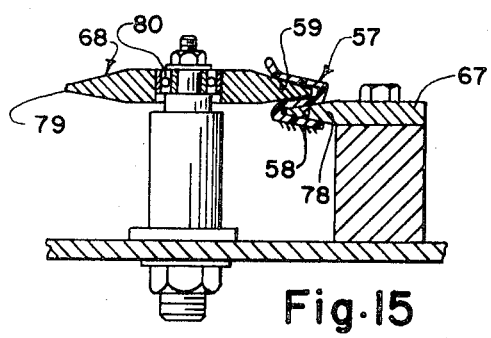
FIG. 15 is a cross-sectional view taken along the line 15—15 of FIG. 12.

The spreader blade 67 (FIG. 15) presents a tapered edge 68 which extends into the recess 58 of the strip connector 57. The guide wheel 68 presents a tapered annular portion 79 which extends into the recess 59 of the strip connector 57. The guide wheel 68 is freely rotatable about the journal 80.

Figures 16, 17:
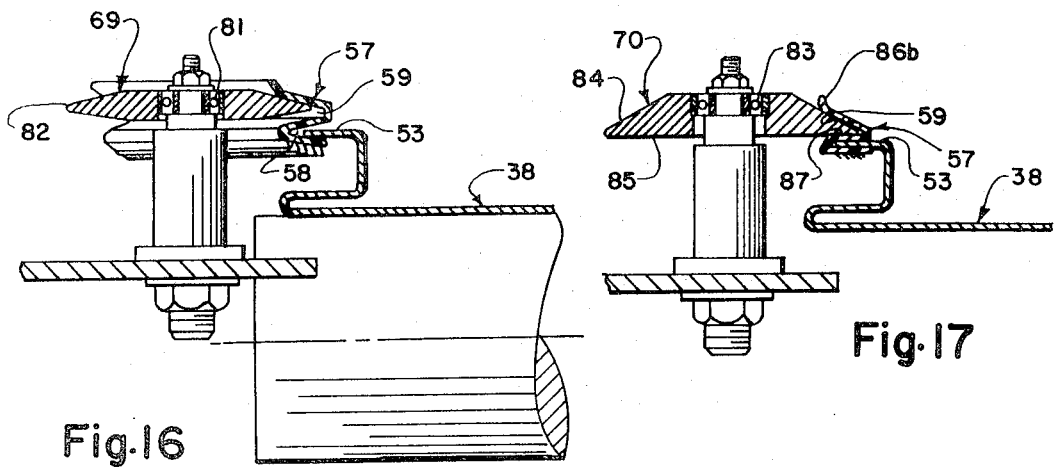
FIG. 16 is a cross-sectional view taken along the line 16—16 of FIG. 12.
FIG. 17 is a cross-sectional view taken along the line 17—17 of FIG. 12.

The guide wheel 69 (FIG. 16) is freely rotatable about the journal 81 and presents a tapered annular portion 82 which is received in the recess 59 of the strip connector 57. It will be observed in FIG. 12 that the spreader blade 67 presents two tapered edges 78, one immediately adjacent to the guide wheel 68 and the other immediately adjacent to the guide wheel 69. As the strip connector 57 progresses from the guide wheel 68 (FIG. 15) to the guide wheel 69 (FIG. 16) the tapered annular portion 82 extends into the recess 59 thereby supporting the strip connector 57. The second tapered edge 78 of the spreader blade 67 (FIG. 12) is not visible in FIG. 16. However, the second tapered edge maintains the recess 58 of the strip connector 57 in a wider-than-normal open condition whereby the first edge 53 of the facing sheet 38 is easily introduced therein.

The guide wheel 70 (FIG. 17) which is downstream of the guide wheel 69 (FIG. 16) also is freely rotatable about a journal 83 and presents a tapered upper annular surface 84 and a flat lower face 85. A peripheral portion of the guide wheel 70 extends over the first edge 53 of the liner sheet 38 and into the opening 59 of the strip connector 57. The guide wheel 70 maintains the strip connector 57 engaged with the first edge 53 of the liner sheet 38.

Figure 18:
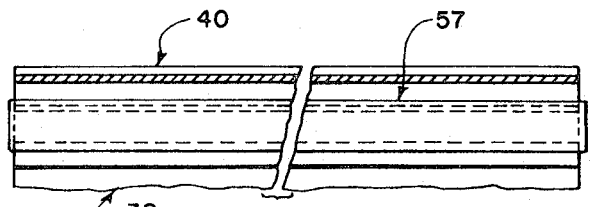
FIG. 18 is a fragmentary cross-sectional view, taken along the line 18—18 of FIG. 9, with the foam core removed to better illustrate the present resilient strip connection.
Figure 19:
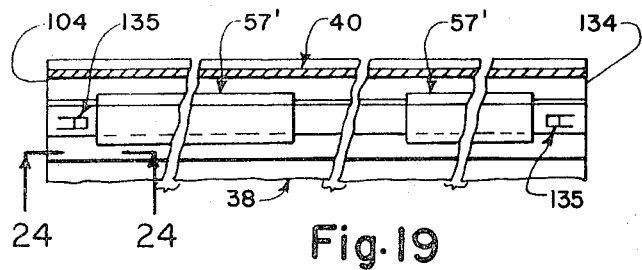
FIG. 19 is a view similar to FIG. 18 illustrating an alternative arrangement of the present resilient strip connection.

The strip connector 57 may be provided as a single element extending along substantially the entire length of the two sheets 38, 40, see FIG. 18. Alternatively, the strip connector may be provided in segments 57' which are applied at longitudinally spaced-apart locations on the two sheets 38, 40, see FIG. 19.

Figure 20:
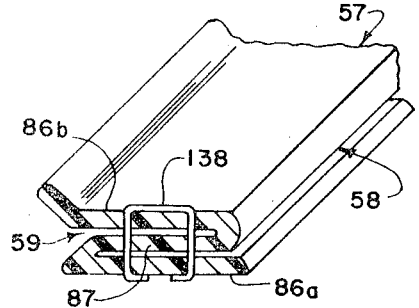
FIG. 20 is a fragmentary isometric view, partly in cross-section, illustrating the resilient strip connector with staple means applied thereto.
Figure 21:
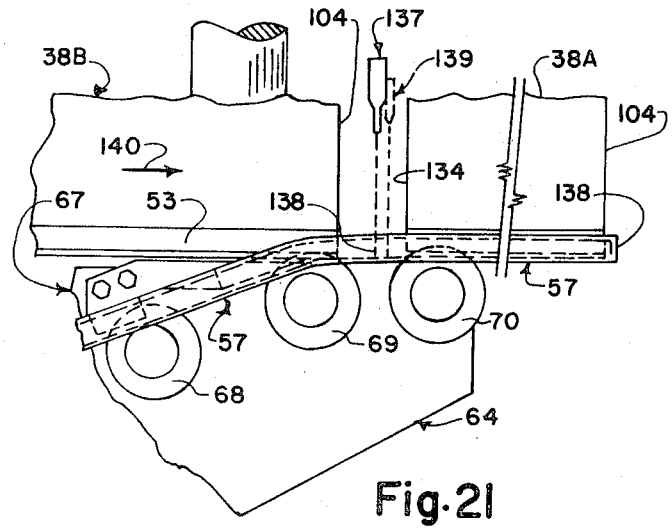
FIG. 21 is a fragmentary plan view, similar to FIG. 12, illustrating the use of the resilient strip connector of FIG. 20.

The present apparatus may be provided with means, schematically illustrated at 137 in FIG. 21, for applying a clamping element such as a staple 138 (FIG. 20) to the strip connector 57. When installed, the staple 138 (FIG. 20) extends through the lower, upper and central arms 86a, 86b and 87. The staple 138 restricts the recesses 58, 59 and prevents longitudinal movement of the two sheets 38, 40 forwardly of the strip connector 57 and relative to each other during passage thereof through the apparatus of FIG. 1. The two sheets 38, 40 are thus retained in registered relation.

The fastener applying means 137 preferably is disposed in the region of the strip connector applicator means 64 (FIG. 21), wherein the strip connector 57 is guided by the spreader blade 67 and the guide wheels 68, 69, and 70 while being applied to the first edge 53 of the next liner sheet 38B, as described above. Suitable sensing means (not illustrated) may be provided for sensing, for example the trailing edge 134 of the preceding sheet 38A (FIG. 21) and for activating the fastener applying means 137.

In operation, the fastener applying means 137 applies a staple 138 to the strip connector 57 as illustrated in FIG. 21. Thereafter, as the sheet 38B is driven forwardly (arrow 140) the leading edge 104 of the first edge 53 thereof wedges in the now-restricted recess 58 (FIG. 20) and carries the strip connector 57 forwardly therewith. The overall arrangement is such that successive liner sheets are presented in end-to-end spaced-apart connected relation — the connection being provided by the resilient strip connector 57, as illustrated in FIG. 22.

The end-to-end connected liner sheets proceed through the sequential zones 31 through 34 and then into the panel sizing conveyor means 47 (FIG. 1). Cut-off means 143 (FIGS. 1 and 22) is provided for trimming the strip connector 57 substantially flush with the opposite ends of each panel 49. The cut-off means 143 preferably is located along the length of the panel sizing conveyor means 47, see FIG. 1. Suitable sensing means (not illustrated) is provided for sequentially sensing the opposite ends of each panel, and activating the cut-off means 143 to trim the strip connector 57.

Alternatively, shear means, such as the blade means 139 illustrated in dotted outline in FIG. 21, may be employed in conjunction with the means 137. In this arrangement, the means 137 applies a staple 138 to the strip connector 57 whereupon the blade means 139 shears the strip connector 57 at a location adjacent to the staple 138. The arrangement is such that individual panels 49 (FIG. 23) are conveyed in succession through the sequential zones 31 through 36 (FIG. 1). The strip connector 57 of each panel 49 presents leading and trailing strip ends 141, 142 which are sequentially trimmed off by the cut-off means 143.

Alternatively, the assembled sheets 38, 40 may be provided with tab means 135 (FIG. 19) for retaining the two sheets 38, 40 in registered relation during passage through the apparatus of FIG. 1. The tab means 135 is provided at least adjacent to the leading edge 104 and preferably adjacent to the leading edge 104 and the trailing edge 134. As best shown in FIG. 24, the tab means 135 may be formed by piercing and shearing the overlapped first edges 53, 54 of the two sheets 38, 40 to provide tabs 136 which are bent back thereby locking the two sheets 38, 40 against longitudinal and lateral movement of one relative to the other. The tabs 136 are formed as close to the leading edge 104 and the trailing edge 134 as practical. Also, the tabs 136 preferably bend back toward the leading and trailing ends 104, 135, whereby they have relatively little effect on the divergence and convergence of the two sheets 38, 40.

SHEET ENGAGER

FIG. 25 illustrates, in part, sheet engager means 88 serving to move the first edge 54 of the facing sheet 40 into the recess 59 of the strip connector 57. The sheet engager means 88 comprises, in part, a support block 89 presenting an upper guiding surface 90, and a sheet pusher in the form of an angle member 91 supported by arms 92 (only one visible). Suitably positioned guide rollers 93 engage various segments of the liner sheet 38 thereby maintaining the first edge 53 thereof and the attached strip connector 57 in a selected position relative to the guiding surface 90 of the support block 89. Compression rollers 94 (only one shown) maintain the central web 51 of the liner sheet 38 in frictional contact with the driven conveyor 37.

Figure 26A:
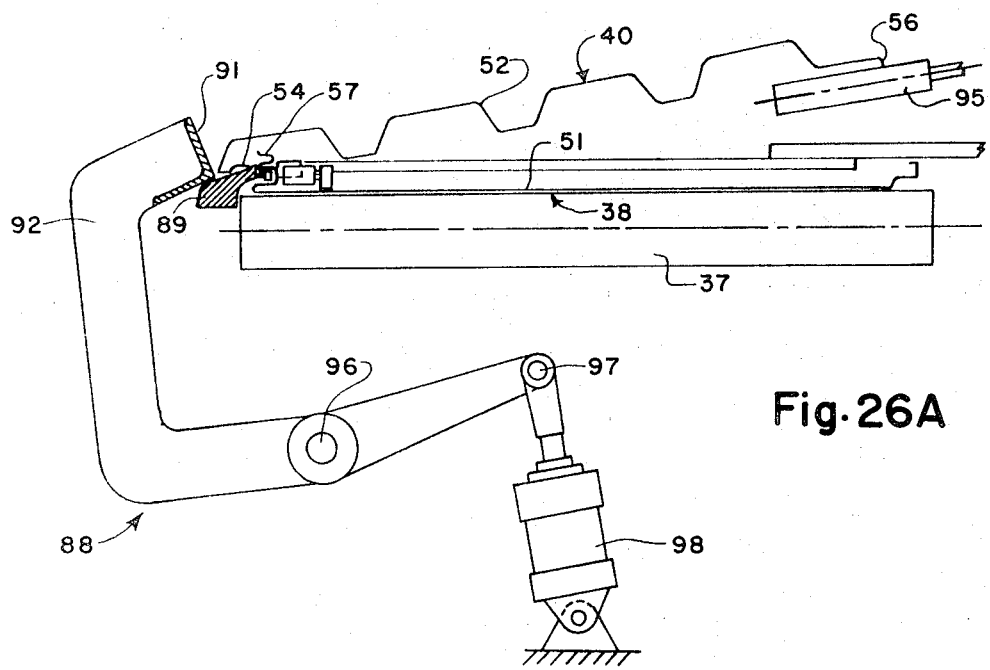
FIGS. 26A and 26B are cross-sectional views taken along the line 26—26 of FIG. 1, illustrating the joining of the two sheets by means of a resilient strip connection.

Referring to FIG. 26A, the second edge 56 of the facing sheet 40 is supported by support rollers 95 (only one shown) which are elevated above the support block 89, whereby the facing sheet 40 is inclined relative to the liner sheet 38 and is bowed in the region between the first and second edges 54, 56. The temporary bowed condition of the facing sheet 40 disposes the first edge 54 in position for introduction into the recess 59 of the strip connector 57.

Figure 26B:
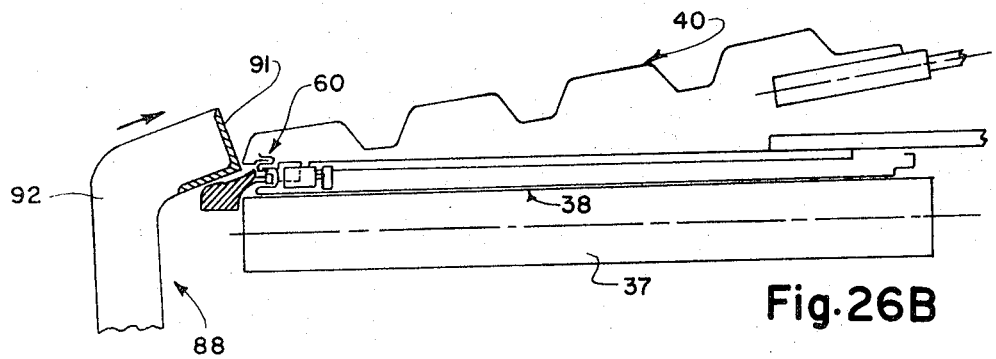

As shown in FIG. 26A, the arm 92 of the sheet engager means 88 is pivotally supported at 96 and has its opposite end 97 pivotally connected to motor means 98, such as, a fluid operated piston and cylinder. When activated, the motor means 98 causes the arm 92 to pivot about the pivotal support 96 thereby moving the angle member 91 from the position illustrated in FIG. 26A (dotted outline showing in FIG. 25) to the position illustrated in full lines in FIGS. 25 and 26B.

It will be observed in FIG. 26A that initially the facing sheet 40 is aligned with the liner sheet 38 such that the central webs 51, 52 thereof are in confronting relation. Also, the facing sheet 40 is laterally offset — to the left as viewed in FIG. 26A — from the liner sheet 38. Activation of the sheet engager means 88 causes the facing sheet 40 to be moved from the position illustrated in FIG. 26A (dash-dot outline showing in FIG. 25) to the position illustrated in full lines in FIGS. 25, 26B, whereby the sheets 38, 40 are joined by the aforesaid resilient strip connection 60.

SHEET DIVERGING ZONE

Figure 27:
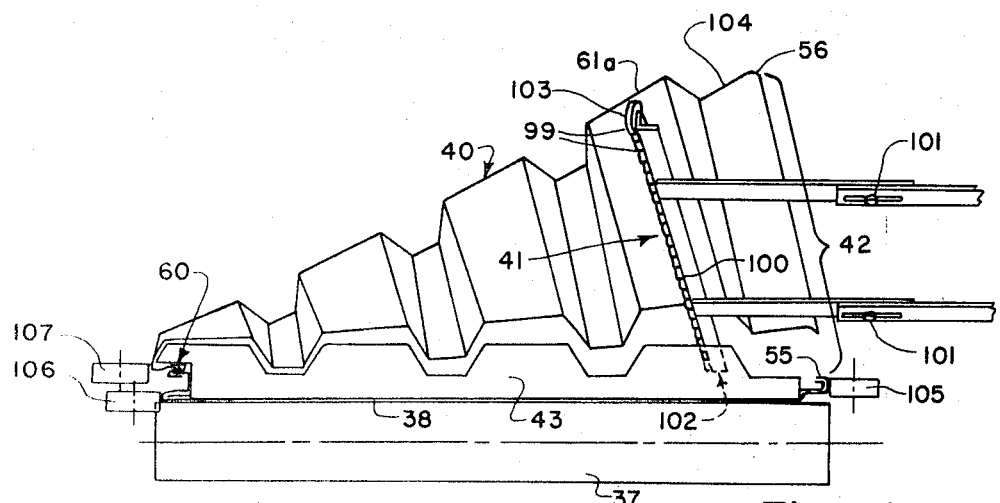
FIG. 27 is a view taken along the line 27—27 of FIG. 1, illustrating diverging of the two sheets to provide an opening therebetween.

The first ramp means 41 (FIG. 27) may comprise a row of rollers 99 supported for free rotation by a frame structure 100. The rollers 99 are adapted to engage the crest 61a of the facing sheet 40. Adjustment means 101 is provided for aligning the row of rollers 99 with respect to the crest 61a. The ramp means 41 includes first and second ends 102, 103. The ramp means 41 is inclined (see also FIGS. 4 and 5) from the first end 102 to the second end 103 upwardly away from the liner sheet 38. As the sheets 38, 40 advance through the sheet diverging zone, the ramp means 41 causes the two sheets 38, 40 to diverge along the second edges 55, 56 thereof which are remote from the resilient strip connection 60, thereby to provide the opening 42 therebetween. Thus, divergence of the sheets 38, 40 begins at the leading edge 104 of the facing sheet 40 and progresses along the length thereof. While the sheets 38, 40 are in the sheet diverging zone 32, the dam elements 43 (only one visible) are applied to the opposite ends of the liner sheet 38. It will be observed in FIG. 27 that the liner sheet is maintained in position along the conveyor 37 by rows of positioning rollers 105, 106 of which only one is visible, which engage the opposite longitudinal edges of the facing sheet 38. A row of positioning rollers 107 (only one visible) engage that side of the facing sheet 40 remote from the second edge 56, thereby to maintain the facing sheet 40 in position relative to the liner sheet 38.

FOAMING ZONE

Figure 28:
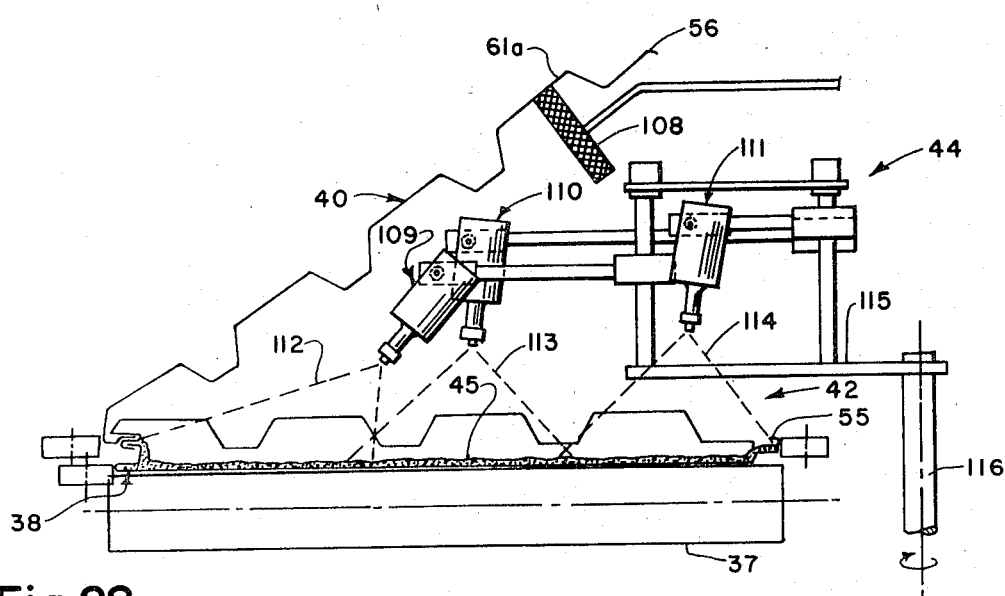
FIG. 28 is a cross-sectional view taken along the line 28—28 of FIG. 1, illustrating the introduction and distribution of foamable foam forming ingredients between the separated sheets.

The two sheets 38, 40 advance from the sheet diverging zone 32 through the foaming zone 33. As best shown in FIG. 5, the facing sheet 40 is supported during its progress through the foaming zone 13 by support wheels 108 provided at the opposite ends of the foaming zone 33. As shown in FIG. 28, the support wheels 108 are positioned to engage the crest 61a of the facing sheet 40 and to support the facing sheet 40 in an inclined relationship with respect to the facing sheet 38.

As the two sheets 38, 40 advance through the foaming zone, the foam distributing means 44 deposits the foam coating 45 across the width and along substantially the entire length of the liner sheet 38. In the preferred arrangement, the foam distributing means 44 comprises plural spray means 109, 110, 111 which are positioned such that the spray patterns 112, 113, 114 thereof deposit overlapping bands of the foam forming ingredients. Each of the dispensing means 109, 110 and 111 receives a foamable composition. Where the foam core 48 (FIG. 9) comprises polyurethane, the foamable composition includes polyol, dissolved halogenated hydrocarbon blowing agent, polyisocyanate, catalyst, and stabilizer. Foamable compositions which produce organic as well as inorganic foam cores may also be used.

In an operating embodiment, the foam distribution is accomplished by the hot airless spray system which provides hydraulic atomization of the foamable composition at the nozzle end of the spray means 109, 110, 111. In the hot airless spray system, the components of the foamable composition are separately heated to a selected temperature so as to reduce their viscosity to a level suitable for pumping. The heated components are then separately pumped to the dispensing means 109, 110 and 111 in which they are mixed and hydraulically atomized to produce the spray patterns 112, 113 and 114.

It will be observed in FIG. 28 that the dispensing means 109, 110 and 111 are supported on a carriage 115 which is movable between a first or operating position illustrated in FIG. 28 and a second position (not illustrated) outboard of the conveyor 37. In the second position, the dispensing means 109, 110 and 111 are accessible for cleaning and routine maintenance operations. The carriage 115 may, for example, be supported by a pivot shaft 116 for pivotal movement between the first and second positions.

SHEET CONVERGING ZONE

Figure 29:
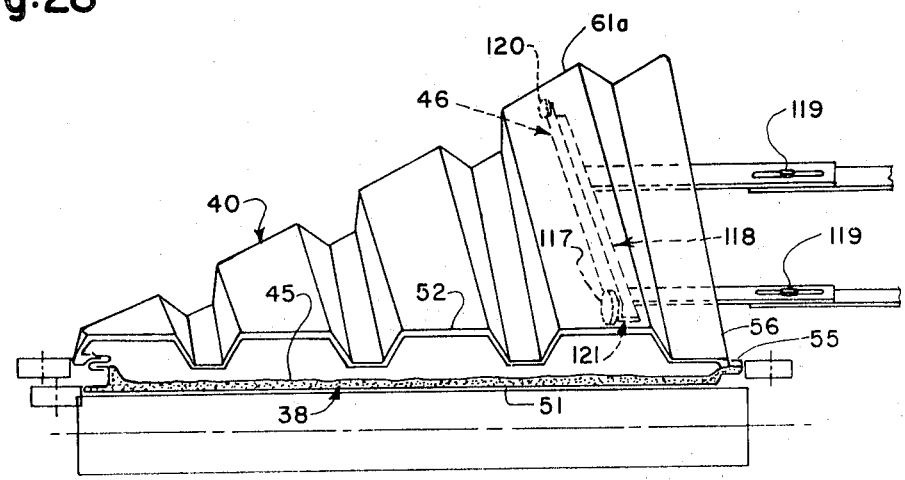
FIG. 29 is a view taken along the line 29—29 of FIG. 1, illustrating convergence of the two sheets.

The second ramp means 46 (FIG. 29) may comprise a row of rollers 117 supported for free rotation by a frame structure 118. The rollers 117 are positioned to engage the crest 61a of the facing sheet 40. Adjustment means 119 provide for aligning the rollers 117 with the crest 61a. The second ramp means 46 includes first and second ends 120, 121 — the first end 120 being elevated above the second end 121, see also FIGS. 5 and 6. Thus, the second ramp means 46 causes the two facing sheets 38, 40 to converge along the corresponding second edges 55, 56, thereby to reposition the central webs 51, 52 thereof in confronting relation. The convergence occurs while the foam forming ingredients (foam coating 45) are actively foaming and increasing in volume.

SHEET RETENTION ZONE

Figure 30:
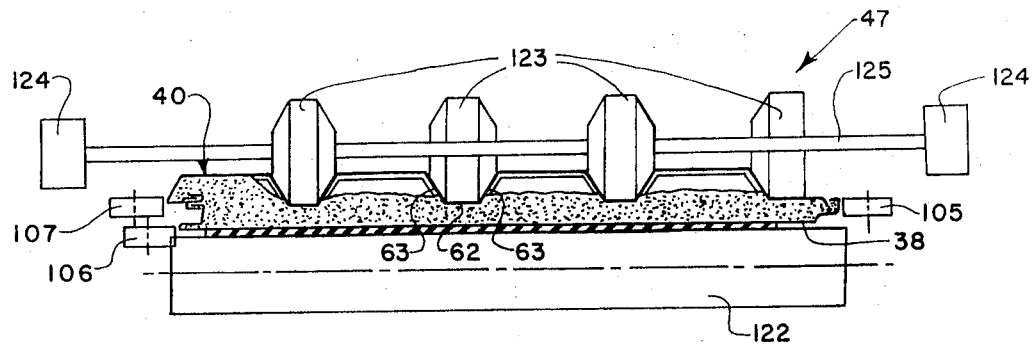
FIG. 30 is a cross-sectional view taken along the line 30—30 of FIG. 1, illustrating retention of the two sheets in aligned relationship.

Immediately after the two sheets 38, 40 converge, they are introduced into the panel sizing conveyor means 47 (FIGS. 6 and 30) wherein the two sheets 38, 40 are retained in the aforesaid confronting relation until the foam forming ingredients have completed their foaming and volume expansion. As best shown in FIG. 30, the panel sizing conveyor means 47 may comprise a driven conveyor 122 serving to support the joined facing sheets 38, 40. The rows of positioning rollers 105, 106 guide the facing sheet 38 during its transit through the panel sizing conveyor means 47. The conveyor means 47 additionally includes guide wheels 123 supported by end journals 124 for vertical adjustment relative to the driven conveyor 122. It will be observed in FIG. 30 the wheels 123 are shaped to fit in the troughs defined by the webs 63 and the common valleys 62 of the facing sheet 40. Hence, the wheels 123 serve to maintain the facing sheet 40 in aligned, confronting relation with respect to the liner sheet 38 during its residence time in the conveyor means 47. The wheels 123 also may be adjustable along the length of the supporting shafts 125 thereby to align the wheels 123 with respect to the troughs of the facing sheet 40 or to reposition the wheels 123 to correspond with the troughs of facing sheets of different profile.

It will be appreciated that the length of the panel sizing conveyor 47 is such that the foam forming ingredients are allowed to complete their foaming and consequent volume expansion. In an operating embodiment, the panel velocity through the panel sizing conveyor means 47 ranges from 35 to 40 feet per minute — the overall length of the conveyor means 47 being about 120 feet.

I claim:

1. In apparatus for assembling a succession of foam filled construction panels each comprising a liner sheet, a facing sheet, and a foamed-in-place foam core, the two sheets having central webs, first edges and second edges, the combination comprising sequential zones including A. a sheet assembly zone having
   applicator means for applying a resilient strip connector to the first edge of the liner sheet; and
   engager means for engaging the first edge of the facing sheet with said resilient strip connector, thereby to provide a resilient strip connection between the first edges of the two sheets, the two sheets being positioned with the central webs thereof in confronting relation;

B. a sheet diverging zone having
   means for diverging the thus joined sheets along second edges thereof remote from said resilient strip connection, thereby to provide an opening therebetween;

C. a foaming zone having
   distributing means extending through said opening between the two sheets for distributing foamable foam forming ingredients along the length and across the width of the liner sheet;

D. a sheet converging zone having
   means for converging the two sheets along the second edges thereof to position the central webs thereof in confronting relation, and with the actively foaming foam forming ingredients between the thus aligned sheets; and conveyor means for supporting and moving the two sheets through said sequential zones.

2. The apparatus of claim 1 wherein said dispensing means comprises plural spray devices positioned to deposit overlapping bands of said foamable foam forming ingredients on said liner sheet.

3. The apparatus of claim 1 wherein said diverging means comprises a ramp positioned to engage the facing sheet at a location adjacent to the second edge thereof, thereby to separate the facing sheet from the liner sheet.

4. The apparatus of claim 1 wherein said converging means comprises a ramp positioned to engage the facing sheet at a location adjacent to the second edge thereof, thereby to converge the facing sheet with the liner sheet and to position the central web thereof in confronting relation with the central web of the facing sheet.

5. The apparatus of claim 1 including supply means for feeding said resilient strip to said applicator means and to the first edge of each first sheet as a continuous strip; and cut-off means downstream of said applicator means for trimming the strip connector substantially flush with the opposite ends of each panel.

6. The apparatus of claim 5 including means for applying a clamping element to said resilient strip connector ahead of the leading edge of each first sheet, thereby to insure movement of each first sheet and the strip connector in unison.

7. The apparatus of claim 6 wherein said clamping element comprises a staple.

8. The apparatus of claim 6 including shear means for cutting the strip connector on that side of said clamping element remote from the leading edge of the first sheet.

9. The apparatus defined in claim 1, including

E. a retention zone disposed downstream of said sheet converging zone, said retention zone having retention means for retaining the thus converged and joined sheets for a time sufficient to allow the said foam forming ingredients to complete their foaming and volume expansion.

10. The apparatus of claim 9 including supply means for feeding said resilient strip to said applicator means and to the first edge of each first sheet as a continuous sheet; and cut-off means located in said retention zone for trimming the strip connector substantially flush with the opposite ends of each panel.

* * * * *